US010915189B2

(12) United States Patent
Gim

(10) Patent No.: US 10,915,189 B2
(45) Date of Patent: Feb. 9, 2021

(54) DISPLAY DEVICE WITH BUILT-IN TOUCH SCREEN AND METHOD FOR DRIVING THE SAME

(71) Applicant: LG Display Co., Ltd., Seoul (KR)

(72) Inventor: SeonGeun Gim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 331 days.

(21) Appl. No.: 15/368,473

(22) Filed: Dec. 2, 2016

(65) Prior Publication Data
US 2017/0168620 A1 Jun. 15, 2017

(30) Foreign Application Priority Data

Dec. 14, 2015 (KR) ........................ 10-2015-0177929

(51) Int. Cl.
*G06F 3/041* (2006.01)
*G06F 3/044* (2006.01)
*G09G 3/36* (2006.01)

(52) U.S. Cl.
CPC ........ *G06F 3/0412* (2013.01); *G06F 3/04184* (2019.05); *G09G 3/3655* (2013.01); *G09G 3/3696* (2013.01); *G06F 3/0443* (2019.05); *G06F 3/04164* (2019.05); *G09G 3/3674* (2013.01); *G09G 3/3685* (2013.01); *G09G 2310/08* (2013.01); *G09G 2354/00* (2013.01)

(58) Field of Classification Search
CPC ...... G06F 3/0412; G06F 3/0416; G06F 3/044; G09G 3/3655; G09G 3/3696
See application file for complete search history.

(56) References Cited

U.S. PATENT DOCUMENTS

| 7,102,604 B2 * | 9/2006 | Hong .................... G09G 3/3696 345/87 |
| 9,007,316 B2 | 4/2015 | Kim et al. |
| 9,098,134 B2 * | 8/2015 | Lee ...................... G02F 1/13338 |

(Continued)

FOREIGN PATENT DOCUMENTS

| CN | 103488325 A | 1/2014 |
| CN | 103513834 A | 1/2014 |

(Continued)

OTHER PUBLICATIONS

European Extended Search Report, European Application No. 16204070.3, dated Apr. 11, 2017, 7 pages.

*Primary Examiner* — Sardis F Azongha
(74) *Attorney, Agent, or Firm* — Fenwick & West LLP

(57) ABSTRACT

A display device with a built-in touch screen according to the present disclosure includes a display panel, a data driver, a gate driver, a touch sensing unit, a common voltage supplier, and a switch circuit, and further includes a common voltage adjuster to supply different common voltages to touch electrodes of the display panel, thereby resolving a local stain or screen vibration problem occurring on the display panel. Further, a method for driving a display device with a built-in touch screen according to one embodiment includes: switching the display panel from a touch mode to a display mode, generating different common voltages, and supplying two or more of the different common voltages to a plurality of touch electrodes (TE) or groups of touch electrodes (TE), thereby resolving an image quality defect.

18 Claims, 13 Drawing Sheets

(56) References Cited

U.S. PATENT DOCUMENTS

| | | | |
|---|---|---|---|
| 9,098,161 B2 * | 8/2015 | Shin | G06F 3/044 |
| 9,201,259 B2 * | 12/2015 | Kim | G02F 1/13338 |
| 9,223,425 B1 * | 12/2015 | Kim | G06F 3/0412 |
| 9,880,677 B2 | 1/2018 | Lee et al. | |
| 10,146,359 B2 * | 12/2018 | Tang | G09G 3/3655 |
| 2013/0314393 A1 * | 11/2013 | Min | G09G 3/36 |
| | | | 345/212 |
| 2013/0335342 A1 | 12/2013 | Kim et al. | |
| 2013/0342496 A1 | 12/2013 | Tsai | |
| 2014/0062990 A1 | 3/2014 | Zhang | |
| 2014/0111496 A1 * | 4/2014 | Gomez | G09G 3/3696 |
| | | | 345/212 |
| 2015/0160761 A1 | 6/2015 | Lee et al. | |
| 2015/0177880 A1 * | 6/2015 | Shin | G06F 3/0446 |
| | | | 345/174 |
| 2016/0328075 A1 | 11/2016 | Luo | |
| 2016/0334658 A1 * | 11/2016 | Jo | G09G 3/3655 |
| 2016/0343326 A1 | 11/2016 | Li et al. | |

FOREIGN PATENT DOCUMENTS

| | | |
|---|---|---|
| CN | 104571701 A | 4/2015 |
| CN | 104777942 A | 7/2015 |
| EP | 3038097 A1 | 6/2016 |
| KR | 20150066791 A | 6/2015 |
| KR | 20150075467 A | 7/2015 |

* cited by examiner

DISPLAY DEVICE WITH BUILT-IN TOUCH SCREEN AND METHOD FOR DRIVING THE SAME

CROSS REFERENCE TO RELATED APPLICATIONS

This application claims priority under 35 U.S.C. 119(a) to Republic of Korea Patent Application No. 10-2015-0177929, filed on Dec. 14, 2015, which is hereby incorporated herein by reference in its entirety.

BACKGROUND

1. Technical Field

The present disclosure relates to a display device with a built-in touch screen, and a method for driving the same.

2. Description of the Related Art

As the information-oriented society progresses, there are growing demands for display devices for displaying images in various forms, and accordingly, different types of display devices, such as a liquid crystal display (LCD), a plasma display panel (PDP), and an organic light emitting display device (OLED), have been used in recent years.

A display device provides a touch-based input mode that enables a user to easily, intuitively, and conveniently input information or commands, departing from other input modes using buttons, a keyboard, or a mouse.

To provide the touch-based input mode, it is necessary to recognize whether a user makes a touch and to accurately detect the coordinates of the touch.

To this end, touch sensing is conventionally provided using one of various touch modes including a resistive mode, a capacitive mode, an electromagnetic induction mode, an infrared mode, and an ultrasonic mode.

Further, in applying a touch screen to a display device, developments have been taking place in building the touch sensor in the display device. Particularly, an in-cell display device that employs a common electrode formed on a lower substrate as a touch screen is in development.

However, when a flat-panel display device, such as an LCD, drives a display, a common voltage supplied to a common electrode causes an image quality defect by stains or flickers in image frames.

Further, when a display device with a built-in touch screen drives a display, a common voltage is supplied to a plurality of touch electrodes on a display panel, in which the common voltage is supplied through touch sensing lines connected to the respective touch electrodes.

However, since the touch sensing lines may have different lengths depending on the positions of the touch electrodes, different levels of common voltages are supplied to the respective touch electrodes.

Further, while a target common voltage changes depending on areas of a display panel as a display device becomes large-sized, conventional systems apply the same common voltage to all touch electrodes, having limitations in resolving a local image quality defect of the display device.

SUMMARY OF THE INVENTION

An aspect of the present disclosure is to provide a display device with a built-in touch screen and a method for driving the same, which may supply different common voltages to a plurality of touch electrodes (TE) or a plurality of touch electrode (TE) groups, thereby resolving a local stain or screen vibration problem occurring on a display panel.

Further, another aspect of the present disclosure is to provide a display device with a built-in touch screen and a method for driving the same, which may provide a compensating voltage to maintain a common voltage supplied to a plurality of touch electrodes (TE) or a plurality of touch electrode (TE) groups, thereby resolving an image quality defect.

To solve the foregoing problems of the conventional art, a display device with a built-in touch screen according to one embodiment includes: a display panel on which a plurality of data lines, a plurality of gate lines, and a plurality of touch electrodes are formed. A touch drive signal is applied to the touch electrodes when a drive mode of the display panel is a touch mode. The display device further includes a data driver configured to drive the plurality of data lines, a gate driver configured to drive the plurality of gate lines, and a touch sensing unit configured to provide the touch drive signal to the plurality of touch electrodes. The display device further includes a common voltage supplier (also referred to herein as a common voltage supplier circuit) configured to generate a plurality of different common voltages and supply two or more of the plurality of different common voltages to the plurality of touch electrodes when the drive mode is a display mode. The display device further includes a switch circuit configured to be disposed between the common voltage supplier and the display panel to adjust supply of the touch drive signal and the two or more of the plurality of different common voltages supplied to the plurality of touch electrodes. Accordingly, a local stain or screen vibration problem occurring on the display panel may be resolved.

In one embodiment, a display device includes a display panel including a plurality of pixels at intersections of a plurality of gate lines and a plurality of data lines. The plurality of pixels includes at least a first pixel and a second pixel. The display device further includes a plurality of touch electrodes including at least a first touch electrode and a second touch electrode. The display device further includes a common voltage supplier circuit to generate a plurality of common voltages including at least a first common voltage and a second common voltage. The common voltage supplier also provides the first common voltage and the second common voltage to the first touch electrode and the second touch electrode, respectively.

Further, a method for driving a display device with a built-in touch screen according to the present disclosure includes: switching a drive mode the display panel from the touch mode to the display mode; generating a plurality of different common voltages, determining a first common voltage and a second common voltage of the plurality of different common voltages, and supplying the first common voltage and the second common voltage to the first touch electrode and the second touch electrode, respectively, in the display mode to display an image, e.g., during a display period of a frame. Further, a common voltage supplied to a plurality of touch electrodes (TE) or a plurality of touch electrode (TE) groups may be maintained using a common voltage compensator circuit, thereby resolving an image quality defect. The compensator circuit may be a feedback circuit including a comparator. In some embodiments, the first electrode is included in a first group of touch electrodes and the second electrode is included in a second group of touch electrodes.

As described above, a display device with a built-in touch screen and a method for driving the same according to the present disclosure may supply different common voltages to a plurality of touch electrodes (TE) or a plurality of touch electrode (TE) groups, thereby resolving a local stain or screen vibration problem occurring on the display panel.

BRIEF DESCRIPTION OF THE DRAWINGS

The above and other objects, features, and advantages of the embodiments described herein will be more apparent from the following detailed description taken in conjunction with the accompanying drawings, in which.

DETAILED DESCRIPTION OF THE EXEMPLARY EMBODIMENTS

Figure 1:
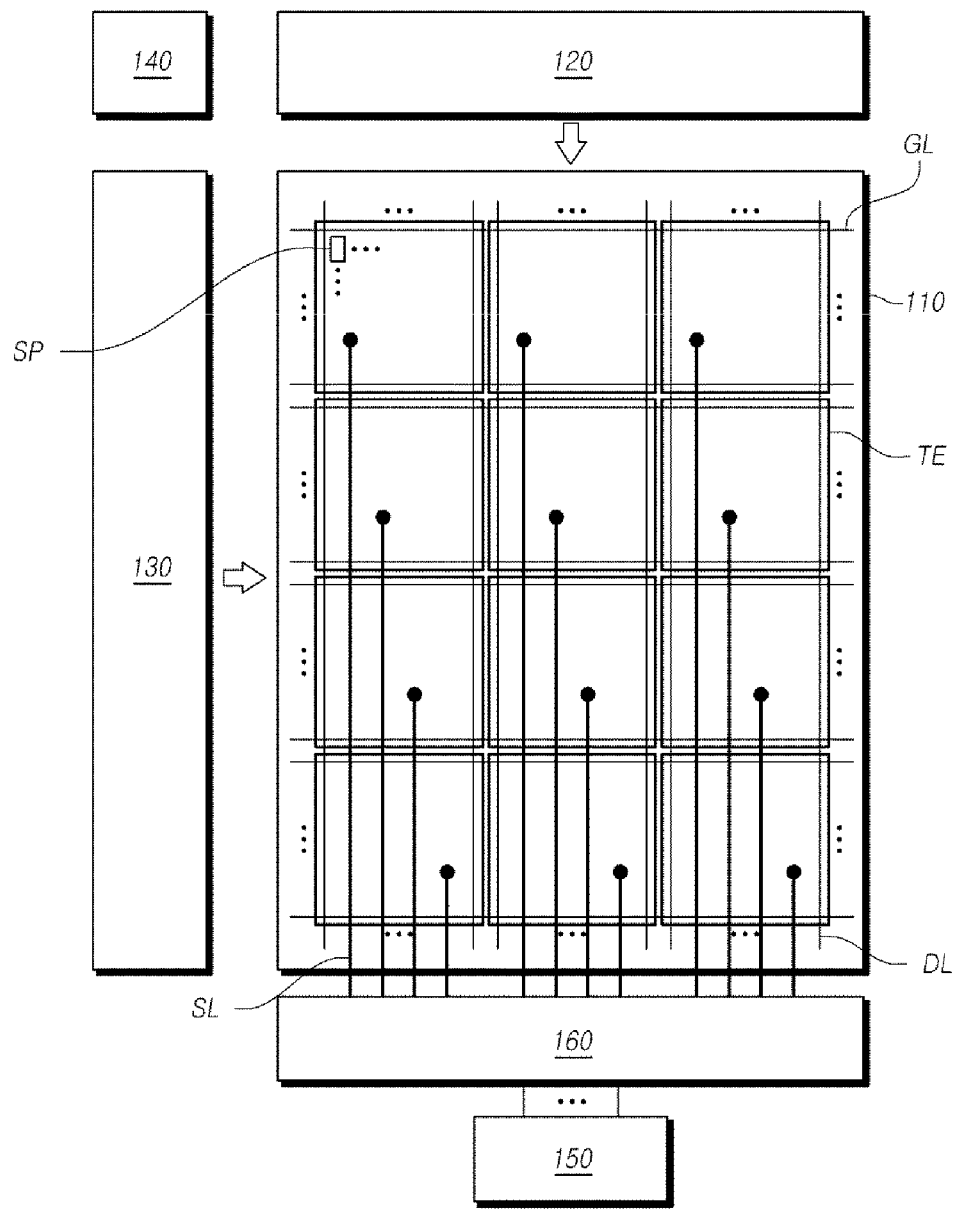
FIG. 1 is a diagram illustrating a configuration of a display device with a built-in touch screen according to one embodiment.

The advantages and features of the present invention and methods of achieving the same will be apparent by referring to embodiments of the present invention as described below in detail in conjunction with the accompanying drawings. However, the present invention is not limited to the embodiments set forth below, but may be implemented in various different forms. The following embodiments are provided only to completely disclose the present invention and inform those skilled in the art of the scope of the present invention.

Shapes, sizes, ratios, angles, the number, and the like illustrated in the drawings for describing embodiments herein are provided for illustrative purposes and are not to be construed as limiting the embodiments hereto. Like reference numerals refer to like elements throughout the specification. When it is determined that a detailed description relating to a related known technique that may make the purpose of the present embodiments of the invention unnecessarily ambiguous in describing the present embodiments of the invention, the detailed description thereof will be omitted here.

As used in this specification, the terms "include," "have," and "comprise" may be used to specify the presence of elements but may not preclude the presence of addition of one or more other elements unless the term "only" is used. Singular forms are intended to include plural referents as well unless the context clearly indicates otherwise.

In understanding components, the components are construed to have an error range, although it is not explicitly specified.

When spatially relative terms, such as "on," "upper," "lower", "beside," and the like, are used to describe a positional relationship between two parts, one or more other parts may be positioned between the two parts unless the term "directly" or "immediately" is used.

When time relative terms, such as "after," "subsequent to," "next," "before," and the like, are used to describe a temporal relationship between cases, the cases may not be successive cases unless the term "directly" or "immediately" is used.

Although the terms "first," "second," and the like are used to describe various elements, these elements should not be limited by these terms. These terms are only used to distinguish one element from another element. Therefore, a first element discussed below could be termed a second element without departing from the teachings of the present embodiments of the invention.

Features of embodiments of the present invention may be partly, entirely coupled, or combined to each other, and may be technically linked or driven in various manners. The embodiments may be implemented independently from each other or may be implemented in association with each other.

Hereinafter, embodiments of the present invention will be described with reference to the accompanying drawings. In the drawings, the size and thickness of a device may be exaggerated for clarity or not necessarily drawn to scale. Like reference numerals refer to like elements throughout the specification.

FIG. 1 is a diagram illustrating a configuration of a display device with a built-in touch screen 100 according to one embodiment.

Referring to FIG. 1, the display device with the built-in touch screen 100 according to one embodiment is a display device that is capable of providing an image display function (also referred to herein as a display function) and a touch sensing function.

The display device with the built-in touch screen 100 according to one embodiment may be, for example, a medium and large-sized device, such as a TV or monitor having a touch sensing function relating to a touch input, or a mobile device, such as a smartphone or a tablet.

Referring to FIG. 1, the display device with the built-in touch screen 100 according to one embodiment includes a display panel 110, a data driver 120, a gate driver 130, and a controller 140 in order to provide the display function.

The display panel 110 may include a plurality of data lines (DL) disposed in a first direction (for example, a vertical direction) and a plurality of gate lines (GL) disposed in a second direction (for example, a horizontal direction).

The data driver 120 drives the plurality of data lines (DL). Here, the data driver 120 may also be referred to as a source driver.

The gate driver 130 drives the plurality of gate lines (GL). Here, the gate driver 130 may also be referred to as a scan driver.

The controller 140 controls the data driver 120 and the gate driver 130. To this end, the controller 140 provides various kinds of control signals to the data driver 120 and the gate driver 130.

The controller 140 starts scanning according to a timing implemented for each frame, converts input image data input (e.g., from outside the touch screen 100) to suit a data signal format used in the data driver 120, outputs converted image data, and controls data driving at a proper time in accordance with the scanning.

The controller 140 may be a timing controller generally used in display technology or a control device that includes a timing controller to perform additional control functions.

The gate driver 130 sequentially supplies on-voltage or off-voltage scan signals to the plurality of gate lines (GL) according to control by the controller 140.

The data driver 120 converts image data received from the controller 140 into an analog data voltage to supply the data voltage to the plurality of data lines (DL) when a specific gate line is opened by the gate driver 130.

The data driver 120 is disposed only on one side (for example an upper or lower side) of the display panel 110 in FIG. 1 but may be disposed on both opposite sides (for example, both upper and lower sides) of the display panel 110 depending on a drive mode, a panel design method, etc.

The gate driver 130 is disposed only on one side (for example a left or right side) of the display panel 110 in FIG. 1 but may be disposed on both opposite sides (for example, both left and right sides) of the display panel 110 depending on a drive mode, a panel design method, etc.

The controller 140 receives, along with the input image data, various kinds of timing signals, including a vertical synchronization signal (Vsync), a horizontal synchronization signal (Hsync), an input data enable (DE) signal, a clock signal (CLK), and the like, from outside the touch screen 100 (for example, a host system).

The display device with the built-in touch screen 100 according to various embodiments may be various types of devices, such as a liquid crystal display (LCD), an organic light emitting display device (OLED), a plasma display panel (PDP), and the like. The display device with the built-in touch screen 100 may be an in-plane switching (IPS) LCD which horizontally arranges and rotates liquid crystal molecules in place to display an image and has advantages of high resolution, low power consumption, and wide viewing angle. More specifically, the display device with the built-in touch screen 100 may be an advanced high performance IPS (AH-IPS) LCD.

Sub-pixels SP disposed on the display panel 110 may be formed and may be associated with a circuit element, such as a transistor.

Meanwhile, the display device with the built-in touch screen 100 according to embodiments of the present invention may include a touch system to provide the touch sensing function.

Referring to FIG. 1, the touch system may include a plurality of touch electrodes (TE) serving as touch sensors and a touch circuit 150 (also referred to herein as a touch sensing circuit) that drives the plurality of touch electrodes (TE) to sense a touch, e.g., when the drive mode is a touch mode.

The touch circuit 150 may sequentially supply a touch drive signal during the touch mode to the plurality of touch electrodes (TE) to sequentially drive one or more of the plurality of touch electrodes (TE).

Subsequently, the touch circuit 150 receives touch sensing signals from the touch electrodes to which the touch drive signal is applied.

The touch circuit 150 may identify whether a touch occurs and the coordinates (e.g., an X-Y point) of the touch based on the touch sensing signals received from the respective touch electrodes (TE).

Here, the touch drive signal may have, for example, a waveform of a pulse-modulated signal with two or more voltage levels.

The touch sensing signals received from the respective touch electrodes (TE) may be different depending on whether a touch occurs around the corresponding touch electrodes by a pointer, such as a finger, a pen, and the like.

The touch circuit 150 may identify a variance in capacitance (or variance in voltage or change in quantity of electric charges) in the touch electrodes (TE) based on the touch sensing signals, thereby detecting whether a touch occurs and the coordinates of the touch.

Referring to FIG. 1, each touch electrode (TE) is connected to a touch sensing line (SL) in order to supply the touch drive signal to each of the plurality of touch electrodes (TE).

Further, in order to sequentially supply the touch drive signal to the touch electrodes TE, the touch system may further include a switch circuit 160 that sequentially connects the touch sensing lines SL, respectively connected to the touch electrodes TE, to the touch circuit 150.

The switch circuit 160 may include at least one multiplexer.

In some embodiments, the touch electrodes (TE) may be patterned into blocks.

Further, a touch electrode (TE) may have a size that is equal to, or corresponds to, the size of one sub-pixel SP area.

Alternatively, as illustrated in FIG. 1, a touch electrode (TE) may have a size that is greater than the size of the sub-pixel SP area.

That is, an area of a touch electrode (TE) may have a size that corresponds to an area of two or more sub-pixels SP.

Meanwhile, referring to FIG. 1, the plurality of touch electrodes (TE) may be disposed to be built in the display panel 110.

In this sense, the display panel 110 may be described as having a built-in touch screen or touch screen panel. That is, the display panel 110 may be an in-cell or on-cell display panel with a built-in touch screen.

Meanwhile, the display device with the built-in touch screen 100 according to embodiments of the present invention may operate in a display mode to provide the display function and in a touch mode to provide the touch sensing function.

Accordingly, the plurality of touch electrodes (TE) may operate as the touch sensors in a touch mode period but may be used as display mode electrodes in a display mode period.

For example, in the display mode period, the plurality of touch electrodes (TE) may operate as display mode electrodes, for example, common electrodes to which a common voltage (Vcom) is applied.

Here, the common voltage (Vcom) is a voltage corresponding to a pixel voltage applied to a pixel electrode.

Meanwhile, as illustrated in FIG. 1, the plurality of touch electrodes (TE) disposed to be built in the display panel 110 may be disposed in an N by M matrix form (N≥2 and M≥2).

Figure 2:
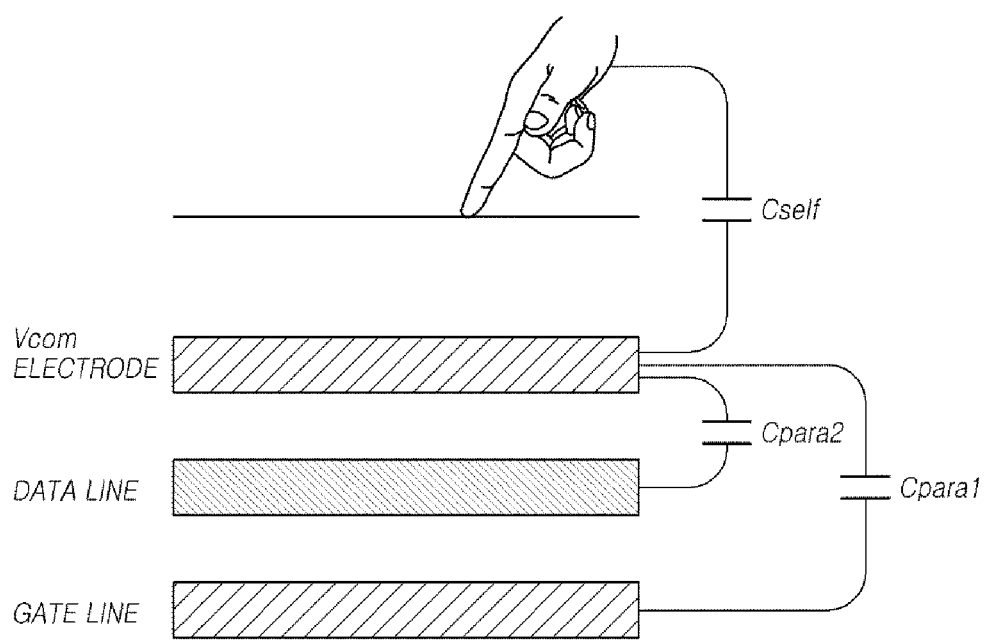
FIG. 2 is a diagram illustrating capacitances (Cself, Cpara1, and Cpara2) that are generated in the touch mode in the display device with the built-in touch screen according to one embodiment.

FIG. 2 is a diagram illustrating capacitances (Cself, Cpara1, and Cpara2) that are generated in the touch mode in the display device with the built-in touch screen 100 according to one embodiment.

Referring to FIG. 2, the plurality of touch electrodes TE, which serves as touch electrodes in the touch mode and serves as common electrodes (Vcom electrodes) forming a liquid crystal capacitor with a pixel electrode in the display mode, forms self-capacitance (Cself) with a pointer (e.g., a finger or a pen touching or in vicinity of the touch screen 100) in the touch mode in order to detect whether a touch occurs and the coordinates of the touch. Meanwhile, although the plurality of touch electrodes (TE) serving as common electrodes may also form parasitic capacitances (Cpara1 and Cpara2) with the gate lines and the data lines, the parasitic capacitances are negligible as compared with the self capacitance.

Figure 3:
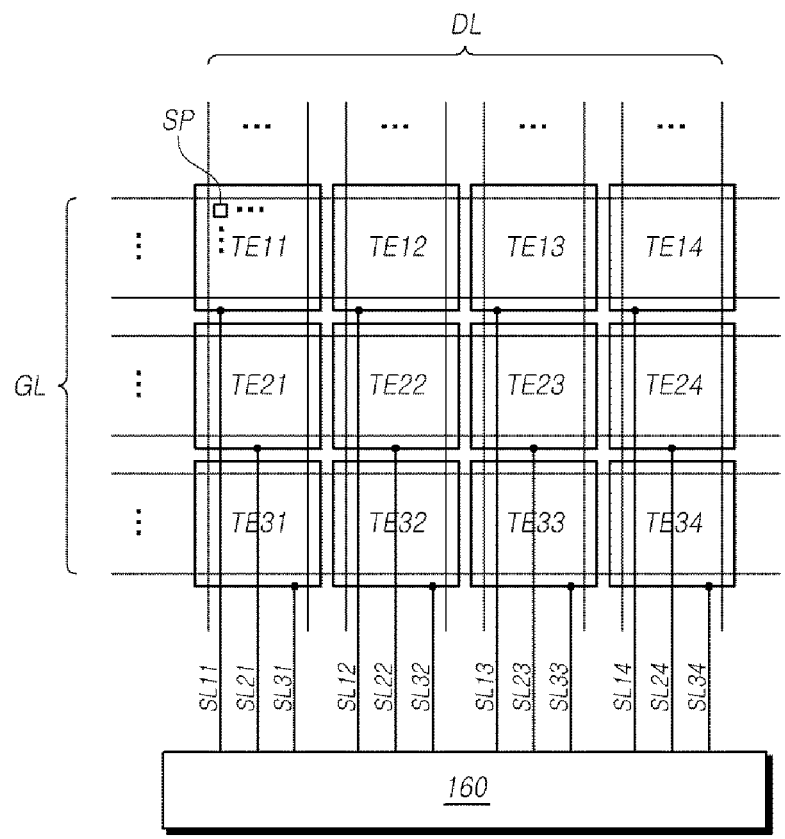
FIG. 3 is a plan view of a display panel included in the display device with the built-in touch screen according to one embodiment.

The following description will be made in more detail on the display panel 110 included in the display device with the built-in touch screen 100 according to embodiments of the present invention, a mode of applying a common voltage and a touch drive signal to the plurality of touch electrodes (e.g., TE11~TE14, TE21~TE24, and TE31~TE34 as shown in FIG. 3) serving as both common electrodes and touch electrodes, a mode of applying a data voltage and a touch drive signal (or corresponding signal) to the data lines DL, and a mode of applying a gate voltage and a touch drive signal (or corresponding signal) to the gate lines (GL).

FIG. 3 is a plan view of the display panel 110 included in the display device with the built-in touch screen according to one embodiment.

Referring to FIG. 3, as described above, the plurality of data lines DL, the plurality of gate lines GL, and the plurality of touch electrodes (TE11~TE14, TE21~TE24, and TE31~TE34) are formed on the display panel 110.

Further, the display panel 110 may operate, as described above, both in the display mode and in the touch mode, for example, of one frame based on timing of the controller 140.

Here, the plurality of data lines (DL) and the plurality of gate lines (GL) formed on the display panel 110 are components for the display panel 110 to serve as a display panel.

Further, the plurality of touch electrodes (TE11~TE14, TE21~TE24, and TE31~TE34) formed on the display panel 110 are components for the display panel 110 to serve as both a display panel and a touch screen panel.

As illustrated in FIG. 3, to transmit a common voltage or touch drive signal to the plurality of touch electrodes (TE11~TE14, TE21~TE24, and TE31~TE34), the touch electrodes (TE11~TE14, TE21~TE24, and TE31~TE34) may be connected to touch sensing lines (SL11~SL14, SL21~SL24, and SL31~SL34).

Accordingly, in the touch mode, a touch drive signal generated in the touch circuit 150 and the switch circuit 160 may be transmitted to all or part of the touch electrodes (TE11~TE14, TE21~TE24, and TE31~TE34) through one or more of the touch sensing lines (SL11~SL14, SL21~SL24, and SL31~SL34). In the display mode, a common voltage (Vcom) supplied from a common voltage supplier (not shown) may be applied to one or more of the touch electrodes (TE11~TE14, TE21~TE24, and TE31~TE34) through one or more of the touch sensing lines (SL11~SL14, SL21~SL24, and SL31~SL34).

The sub-pixels disposed on the display panel 110 may include a red (R) sub-pixel, a green (G) sub-pixel, a blue (B) sub-pixel, and a white (W) sub-pixel.

Meanwhile, as illustrated in FIG. 3, the touch electrodes (TE11~TE14, TE21~TE24, and TE31~TE34) serving as common electrodes and touch electrodes may form a pattern of blocks or may form a pattern including a comb teeth portion in an area corresponding to a sub-pixel SP if necessary.

In some embodiments, the touch electrodes (TE11~TE14, TE21~TE24, and TE31~TE34) serve as common electrodes and the touch electrodes may form the pattern including the comb teeth portion.

Figure 4:
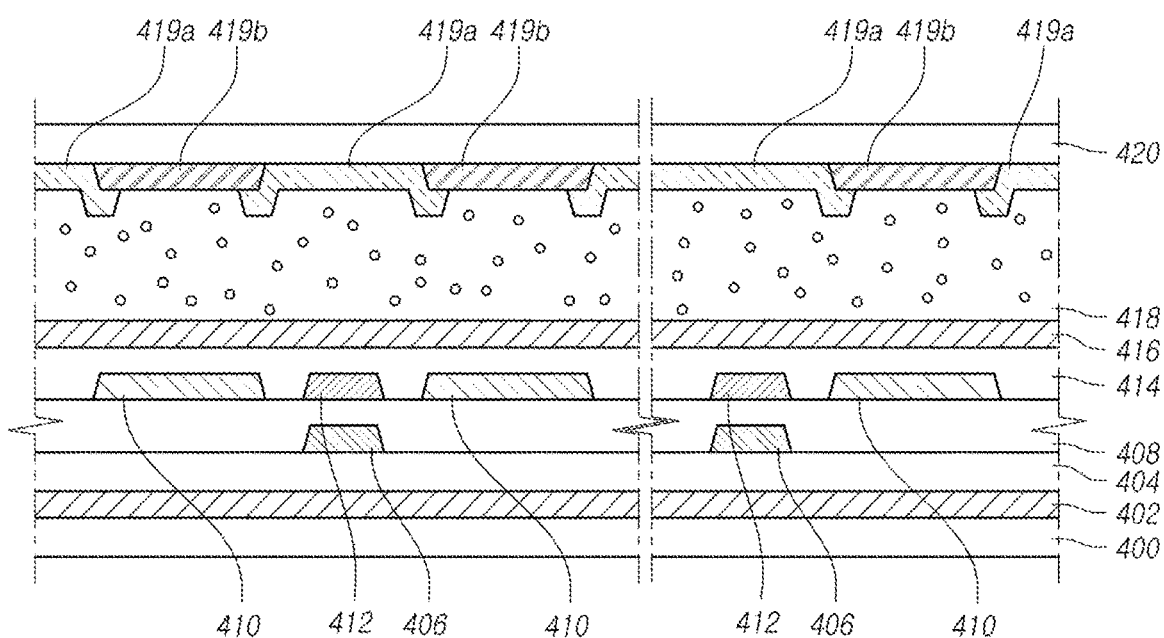
FIG. 4 is an illustrative cross-sectional view of the display panel when the display device with the built-in touch screen according to one embodiment is a liquid crystal display (LCD).

FIG. 4 is an illustrative cross-sectional view of the display panel when the display device with the built-in touch screen 100 according to one embodiment is an LCD.

FIG. 4 is the cross-sectional view illustrating an area (unit touch electrode area) where one of the plurality of touch electrodes (TE11~TE14, TE21~TE24, and TE31~TE34) serving as a common electrode or a touch electrode is formed.

Referring to FIG. 4, in the display panel 110 included in the display device with the built-in touch screen 100, for example, a gate line 402 is formed on a lower substrate 400 in a first direction (e.g., a width direction or horizontal direction as shown in FIG. 3), and a gate insulator 404 is formed thereon.

A data line 406 is formed on the gate insulator 404 in a second direction (e.g., a height direction or vertical direction as shown in FIG. 3), and a first passivation layer 408 is formed thereon.

A pixel electrode 410 of the sub-pixel area and a sensing line 412 are formed on the first passivation layer 408, and a second passivation layer 414 may be formed thereon. Here, the sensing line 412 is connected from the touch electrodes (TE11~TE14, TE21~TE24, and TE31~TE34) serving as common electrodes and touch electrodes to the switch circuit 160 to transmit the common voltage (Vcom) generated in the common voltage supplier to the touch electrodes (TE11~TE14, TE21~TE24, and TE31~TE34) in the display mode and to transmit the touch drive signal generated in the touch circuit 150 and the switch circuit 160 to the touch electrodes (TE11~TE14, TE21~TE24, and TE31~TE34) in the touch mode.

One electrode 416 serving as a common electrode and touch electrode is formed on the second passivation layer 414, and a liquid crystal layer 418 is formed thereon. Here, the one electrode 416 serving as a common electrode and touch electrode is one of the touch electrodes (TE11~TE14, TE21~TE24, and TE31~TE34) and may form a block pattern.

An upper substrate 420, on which a block matrix 419a and a color filter 419b are formed, is disposed on the liquid crystal layer 418.

Although FIG. 4 illustrates the LCD, embodiments of the present invention are not limited thereto but may be applied to various display devices capable of being combined with a touch panel.

A thin-film transistor formed on a back plane to which embodiments of the present invention is applicable may be, for example, amorphous silicon (hereinafter, "a-Si"), metal oxide, and polysilicon. Polysilicon may include low temperature polysilicon (hereinafter, "LTPS") and high temperature polysilicon) hereinafter, "HTPS"), without being limited thereto.

Figure 5A:
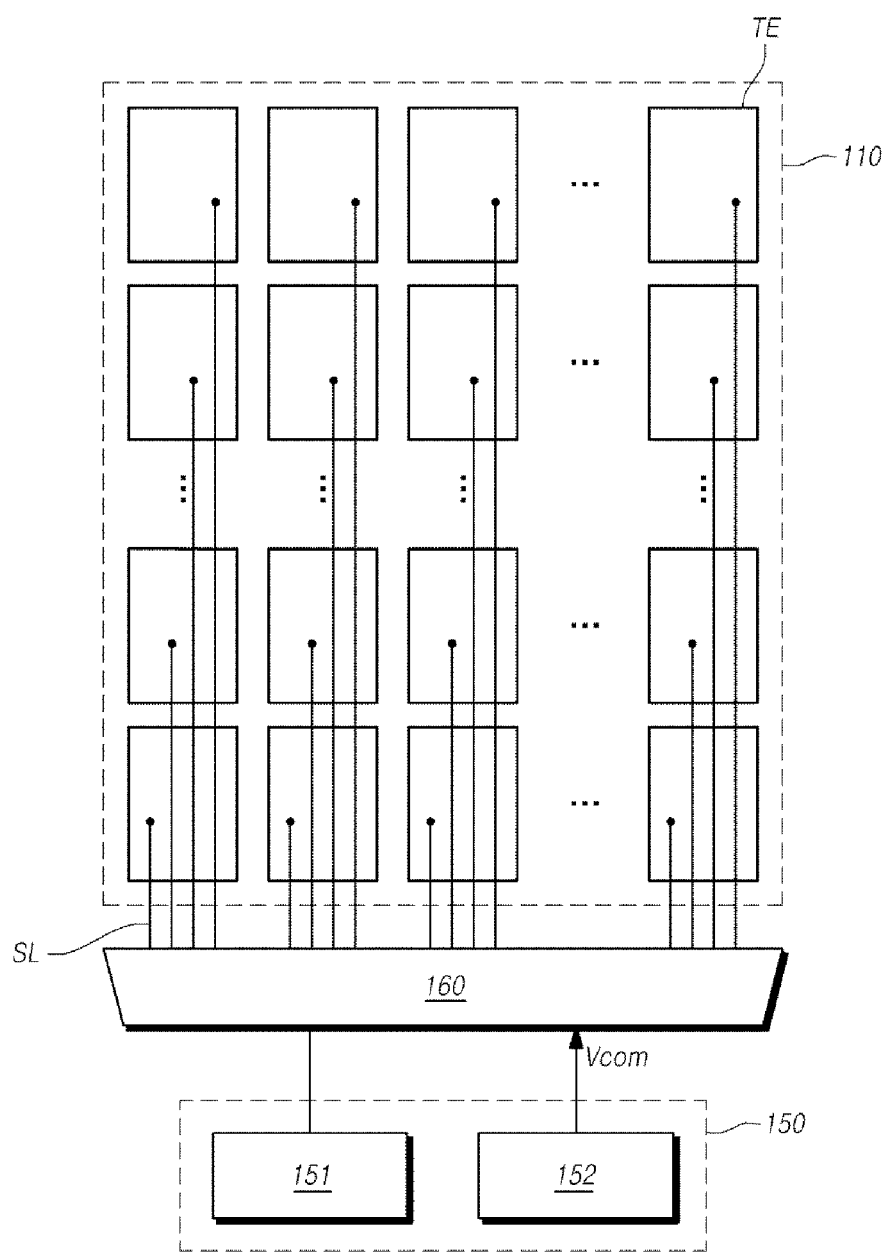
FIGS. 5A and 5B illustrate cases where a drive mode of the display device with the built-in touch screen according to one embodiment is the touch mode and a display mode, respectively.
Figure 5B:
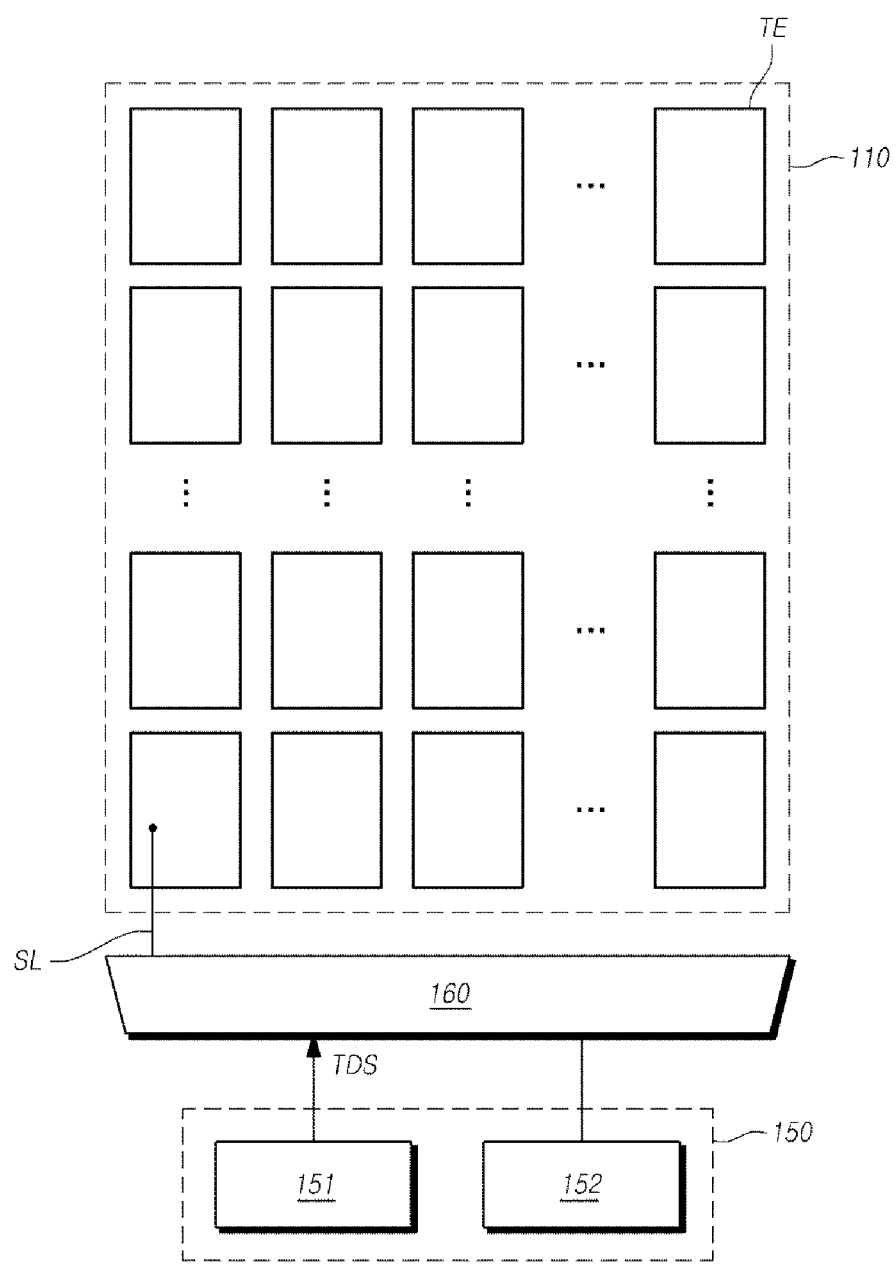

FIGS. 5A and 5B illustrate cases where a drive mode of the display device with the built-in touch screen according to one embodiment is the touch mode and the display mode.

Referring to FIG. 5A along with FIG. 1, when the drive mode of the display device with the built-in touch screen according to one embodiment is the display mode, the data driver 120 outputs a data voltage (Vdata) through the data lines (DL). The gate driver 130 outputs, to a corresponding gate line (GL), a scan signal, which has a high-level voltage (VGH) in a short interval and a low-level voltage (VGL) in the remaining interval, during a period of one frame.

Further, when the drive mode is the display mode, a common voltage (Vcom) is supplied to the switch circuit 160 from the common voltage supplier 152 disposed in the touch circuit 150.

The common voltage supplied to the switch circuit 160 is simultaneously applied to the plurality of touch electrodes (TE) disposed on the display panel through the plurality of touch sensing lines (SL) by an operation of the multiplexer disposed in the switch circuit 160.

Here, the common voltage (Vcom) may be transmitted from the common voltage supplier 152 to the data driver 120 and may then be output by the data driver 120 to the plurality of touch sensing lines (SL). Alternatively, the common voltage (Vcom) may be output directly to the plurality of touch sensing lines (SL) from the common voltage supplier 152, not via the data driver 120.

Thus, when the drive mode is the display mode, the common voltage (Vcom) is supplied to the plurality of touch electrodes (TE), and the data voltage supplied through the data lines (DL) is supplied to the pixel electrode of a sub-pixel, thereby displaying an image.

That is, when the display device is an LCD, liquid crystals are rotated by an electric field formed between the pixel electrodes and the touch electrodes (TE, common electrodes), thereby displaying an image.

Meanwhile, as illustrated in FIG. 5B, when the drive mode of the display device with the built-in touch screen is the touch mode, a touch drive signal (TDS) is applied to at least one of the common electrodes corresponding to the touch electrodes (TE) through at least one of the plurality of touch sensing lines (SL).

Here, for example, the touch drive signal (TDS) may be generated in the touch sensing unit 151 and may be output to at least one of the plurality of touch sensing lines (SL) through the data driver 120 during the touch mode.

Alternatively, the touch drive signal (TDS) may be generated in the touch sensing unit 151 and may be output directly to at least one of the plurality of touch sensing lines (SL) during the touch mode.

However, in some embodiments, the touch electrodes (TE) are disposed at different positions on the display panel 110, and thus the touch sensing lines (SL) connected to the touch electrodes (TE) have different lengths.

Thus, when the drive mode is the display mode, although the same common voltage (Vcom) is supplied to the touch electrodes (TE), differences in resistance and/or capacitance by the lengths of the touch sensing lines (SL) do not allow the uniform common voltage to be supplied to the touch electrodes (TE).

Figure 6:
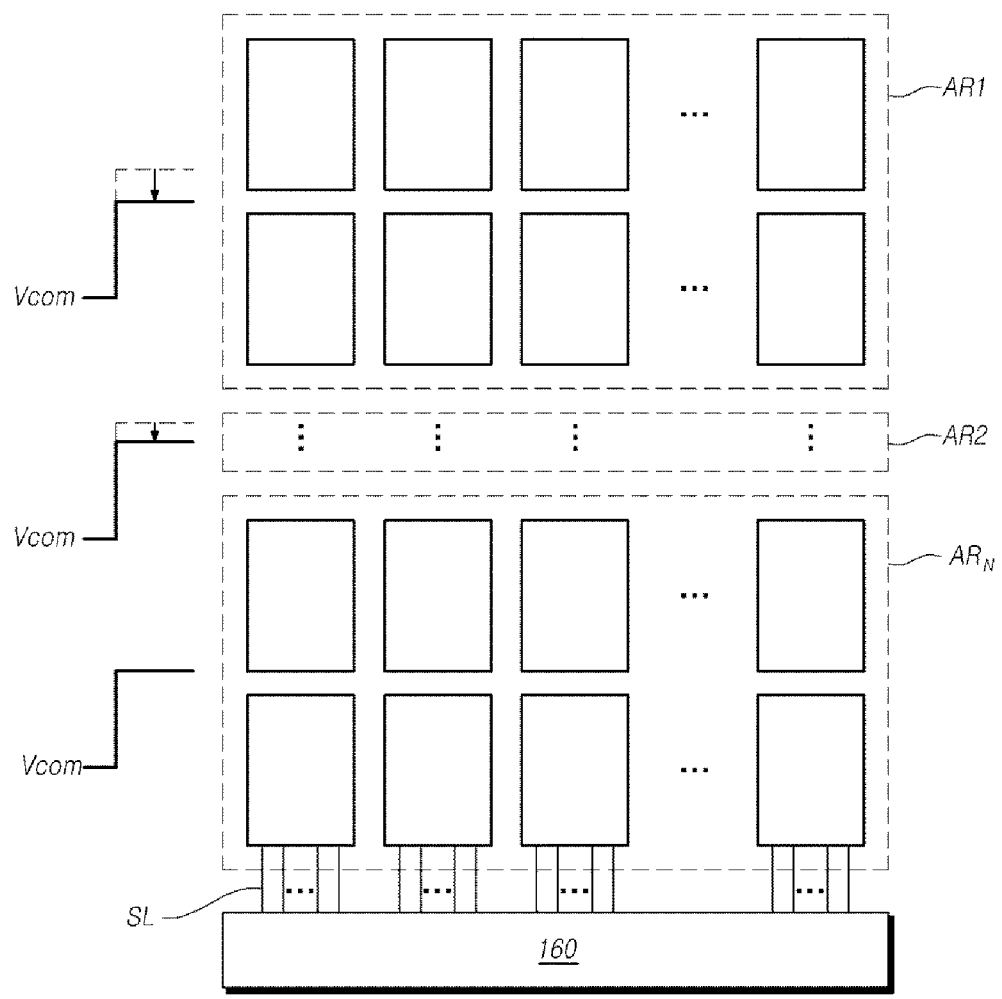
FIG. 6 is a diagram illustrating that common voltages supplied to touch electrodes disposed in the display device with the built-in touch screen are distorted according to the lengths of touch sensing lines.

FIG. 6 is a diagram illustrating that common voltages supplied to the touch electrodes disposed in the display device with the built-in touch screen are distorted according to the lengths of the touch sensing lines.

Referring to the example shown in FIG. 6, when the touch electrodes (TE) disposed on the display panel are divided by position into first to Nth areas (AR1, AR2, ... ARN) relative to the switch circuit 160, a voltage drop in the common voltage (Vcom) is the largest in the first area (AR1), which has the longest lengths of the touch sensing lines (SL) relative to the corresponding lengths of the other areas, and a voltage drop in the common voltage (Vcom) is the smallest in the Nth area (ARN), which has the shortest lengths of the touch sensing lines (SL) relative to the corresponding lengths of the other areas. In other words, as the length of the touch sensing lines increases, the voltage drop in the common voltage supplied to the corresponding area may also increase (e.g., is a substantially proportional relationship). In other embodiments, the relationship between the length of the touch sensing lines and the voltage drop is not necessarily a proportional relationship. For example, the relationship may be a non-linear (e.g., exponential) relationship, an arbitrary relationship, etc.

As described above, when the drive mode of the display device with the built-in touch screen is the display mode, although the same common voltage (Vcom) is supplied to the touch electrodes (TE), the potential or magnitude of the common voltage (Vcom) may change depending on the positions of the touch electrodes (TE), which causes deterioration in image quality.

Further, when a target common voltage changes based on the area as a conventional display device becomes large-sized, there is a limitation in improving the image quality of the large-sized display device since conventional display devices may only apply the same common voltage to all touch electrodes regardless of the corresponding area.

In the display device with the built-in touch screen according to some embodiments of the present invention, a common voltage compensator is disposed between the switch circuit 160 and the touch sensing lines (SL) to maintain a common voltage supplied by the common voltage supplier of the touch circuit 150 to the respective touch electrodes, thereby preventing an image quality defect.

Further, the display device with the built-in touch screen according to embodiments of the present invention may designate the touch electrodes disposed on the display panel or touch electrode groups by position. Additionally, different common voltages may be supplied to the touch electrodes or touch electrode groups, thereby preventing an image quality defect caused by a stain or flicker on the screen.

Figure 7:
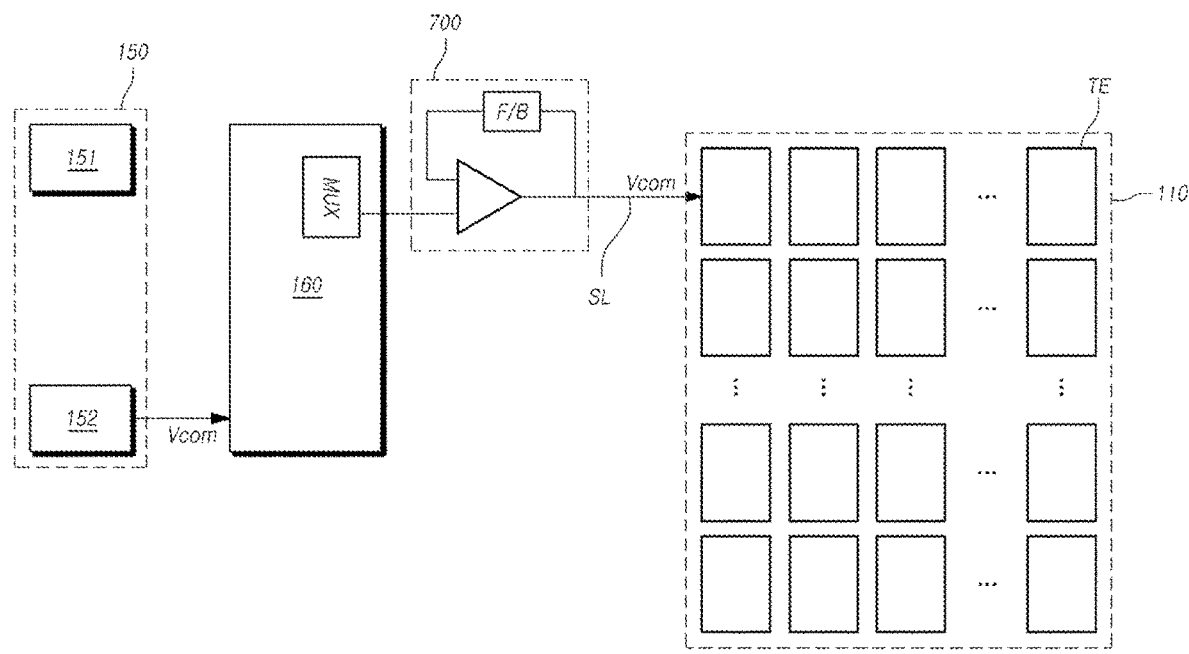
FIG. 7 is a diagram illustrating a structure in which a voltage compensator to compensate for a common voltage is disposed in the display device with the built-in touch screen according to one embodiment.
Figure 8:
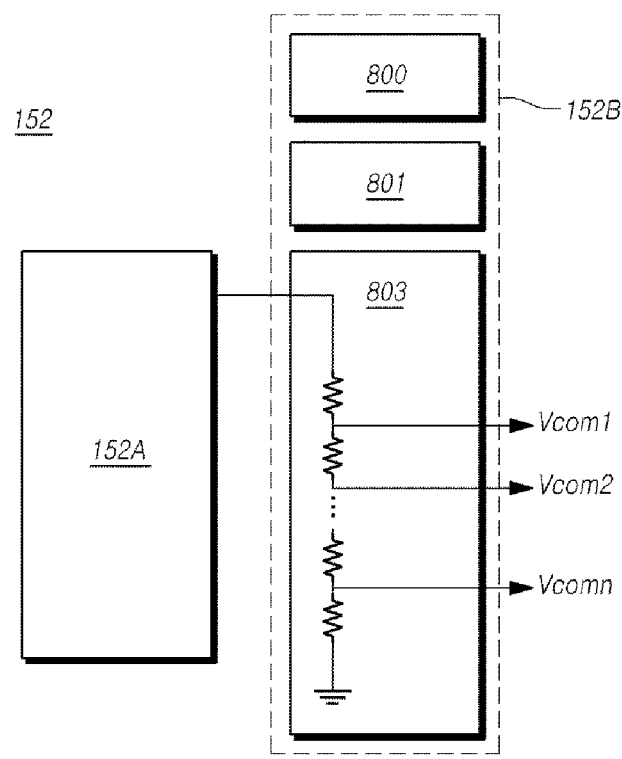
FIG. 8 is a diagram illustrating a structure of a common voltage generator of the display device with the built-in touch screen according to one embodiment.
Figure 9:
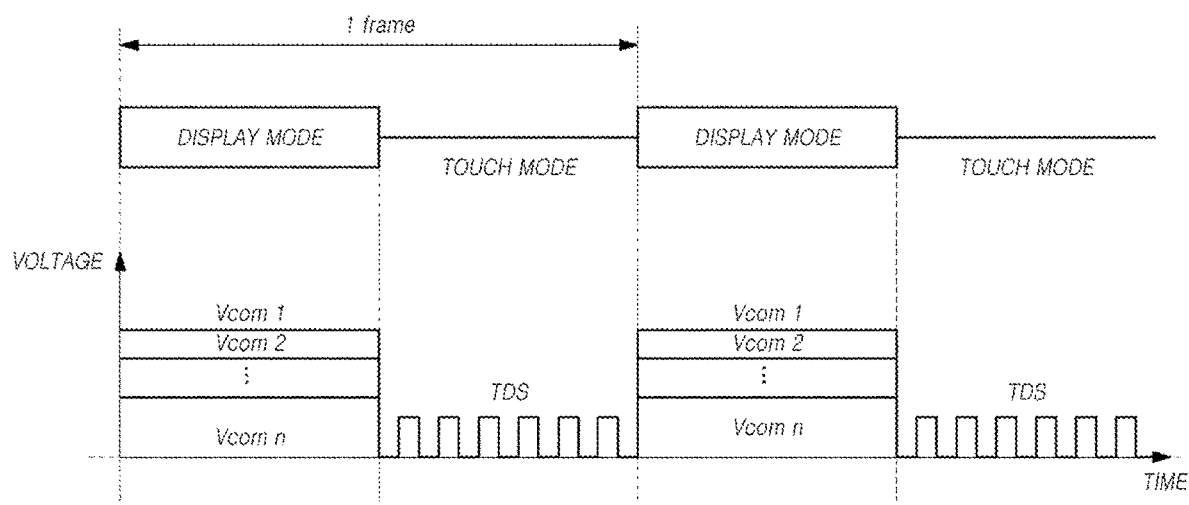
FIG. 9 is a waveform diagram illustrating that different common voltages are supplied to the respective touch electrodes of the display device with the built-in touch screen according to one embodiment.

FIG. 7 is a diagram illustrating a structure in which a voltage compensator to compensate for a common voltage is disposed in the display device with the built-in touch screen of according to one embodiment, FIG. 8 is a diagram illustrating a structure of a common voltage generator of the display device with the built-in touch screen of according to one embodiment, and FIG. 9 is a waveform diagram illustrating that different common voltages are supplied to the respective touch electrodes of the display device with the built-in touch screen of according to one embodiment.

Referring to FIGS. 7 to 9 along with FIG. 1, the display device with the built-in touch screen 100 according to one embodiment includes the touch sensing unit 151 to supply a touch drive signal (TDS) and the common voltage supplier 152 in the touch circuit 150. The following description referring to FIGS. 7 to 9 will be made based on the display mode as the drive mode of the display device with the built-in touch screen 100.

When the drive mode is the display mode, the data driver 120 supplies a data voltage to sub-pixels through the data lines (DL).

Here, the common voltage supplier 152 supplies a common voltage (Vcom) to all touch electrodes (TE) disposed on the display panel 110, for example, through the touch sensing lines (SL).

The switch circuit 160 includes a plurality of multiplexers (MUX) and outputs the common voltage, supplied from the common voltage supplier 152 by an operation of the multiplexers, to the touch sensing lines (SL) according to the operation of the multiplexer, thereby supplying the common voltage to the touch electrodes (TE).

In the display device with the built-in touch screen 100 according to one embodiment the multiplexers may be disposed in the switch circuit 160 to correspond to the plurality of touch electrodes (TE) disposed on the display panel 110, or a plurality of touch electrode (TE) groups may be designated by areas of the display panel 110 and the multiplexers may be disposed corresponding to the respective groups.

Accordingly, embodiments of the present invention may separately supply different common voltages to the respective touch electrodes (TE) disposed on the display panel 110, or may supply different common voltages to the touch electrode (TE) groups.

In one embodiment, when a common voltage according to a touch electrode (TE) group is supplied, all touch sensing lines connected to a corresponding multiplexer are short-circuited, thereby supplying the same common voltage to the corresponding electrode (TE) group.

Further, in the display device with the built-in touch screen according to embodiments of the present invention, the voltage compensator 700 is disposed between the switch circuit 160 and the touch sensing lines (SL) so that the common voltage set by the common voltage supplier 152 may be output to the touch sensing lines (SL) without distortion.

The voltage compensator 700 may be a feedback circuit including a comparator, for example, an op-amp voltage comparator.

As illustrated in the drawings, a common voltage to be supplied to a touch electrode (TE) or touch electrode group is selected by the common voltage supplier 152, and the selected common voltage is supplied to the touch sensing lines (SL) through the multiplexers in the switch circuit 160.

Thus, the display device with the built-in touch screen according to embodiments of the present invention may compensate for a voltage change that may occur while the common voltage set by the common voltage supplier 152 of the touch circuit 150 is passing through the multiplexers in the switch circuit 160, thereby preventing a screen defect.

Further, referring to FIG. 8, the common voltage supplier 152 disposed in the display device with the built-in touch screen according to one embodiment includes the common voltage generator 152A and a common voltage adjuster 152B that generates a plurality different common voltages corresponding to the respective touch electrodes (TE) or touch electrode groups and outputs the different common voltages. The common voltage adjuster 152B generates the plurality of different common voltages based on a predetermined common voltage generated by the common voltage generator 152A.

The common voltage adjuster 152B includes a common voltage determiner 800 to determine which of the different common voltages should be supplied to the respective touch electrodes (TE) or touch electrode (TE) groups on the display panel 110, a common voltage distributor 803 to generate and output the plurality of different common voltages (Vcom1, Vcom2, . . . , Vcomn), and a controller 801 to select and output the common voltages determined by the common voltage determiner 800.

More specifically, the common voltage determiner 800 of the common voltage adjuster 152B designates a touch electrode or touch electrode group to which a common voltage is supplied and determines the level of a common voltage (e.g., corresponding to one of the plurality of different common voltages) to be supplied to the designated touch electrode or touch electrode group.

The common voltage determined by the common voltage determiner 800 is selected from the plurality of different common voltages (Vcom1, Vcom2, . . . , Vcomn) output from the common voltage distributor 803 and is transmitted to the switch circuit 160 according to control by the controller 801. In some embodiments, not all of the different common voltages are necessarily selected to be transmitted to the switch circuit 160. For example, the plurality of different common voltages includes three or more common voltages, and two or more of the different common voltages are transmitted to the switch circuit 160.

The switch circuit 160 supplies the common voltage supplied from the common voltage adjuster 152B to the touch sensing lines (SL) through the multiplexers (MUX). Here, the common voltage compensator 700 disposed between the multiplexers (MUX) and the touch sensing lines (SL) compares the common voltage supplied to the touch sensing lines (SL) and the common voltage output from the multiplexers. In response to detecting a difference in the common voltage supplied to one of the touch sensing lines (e.g., connected to a touch electrode) and the common voltage output from the multiplexers (e.g., supplied by the common voltage supplier 152), the common voltage compensator 700 provides a compensating voltage to the touch sensing line. Thus, the common voltage compensator 700 helps prevent an unwanted change in the common voltage.

Referring to FIG. 9, the drive mode of the display device with the built-in touch screen according to one embodiment may be time-divided into the display mode and the touch mode in a one-frame period, e.g., based on timing of the controller 140.

In a display mode interval within the one-frame period, different common voltages (Vcom1, Vcom2, . . . , Vcomn) are applied to the plurality of touch electrodes (serving as a common electrode in the display mode) or the plurality of touch electrode groups.

In a touch mode interval following the display-mode interval within the one-frame period, a touch drive signal (TDS) is sequentially applied through a corresponding signal line (SL) to one of the plurality of touch electrodes (TE) serving as a touch electrode.

In embodiments of the present invention, the target common voltage may be applied to a touch electrode or touch electrode group to resolve defects of stains or flickers that occur locally on the display panel.

Further, in embodiments of the present invention, as illustrated in FIG. 7, when different common voltages (Vcom1, Vcom2, . . . , Vcomn) are applied to the display panel, the common voltage compensator 700 helps maintain the common voltage supplied to the display panel based on the common voltage set in the common voltage supplier, thereby resolving screen vibrations and defects of afterimages.

Figure 10:
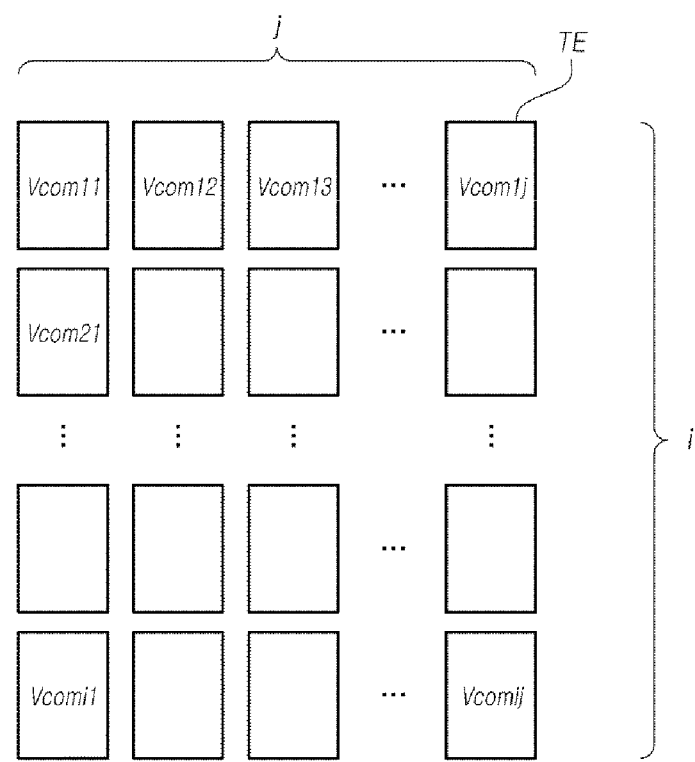
FIG. 10 is a diagram illustrating that different common voltages are supplied to the respective touch electrodes of the display device with the built-in touch screen according to an embodiment.
Figure 11:
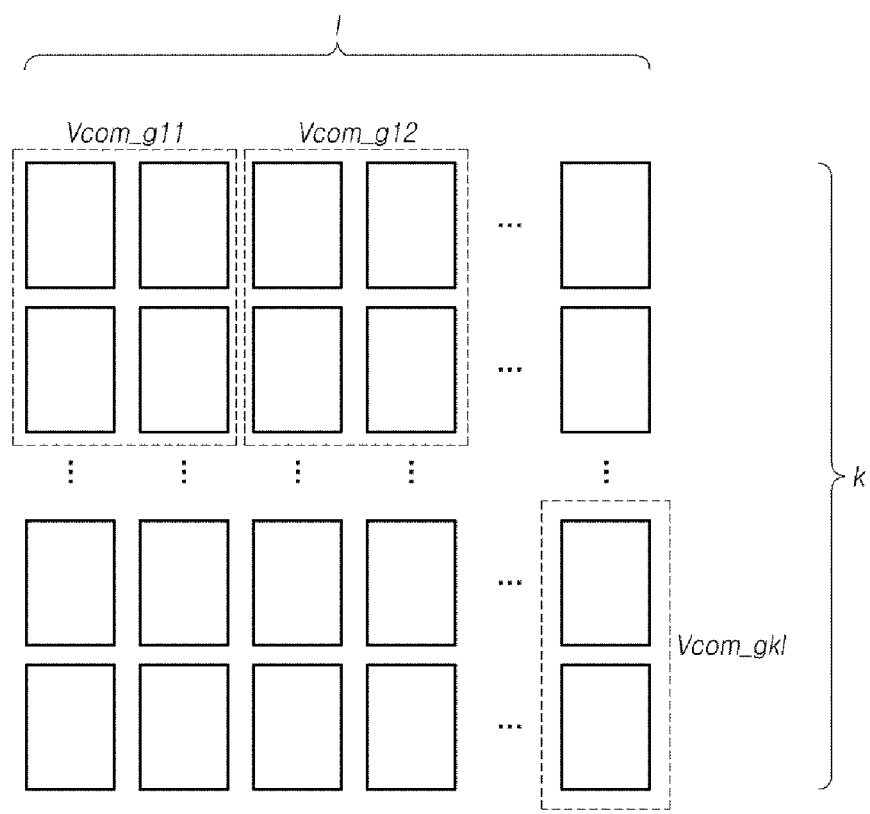
FIG. 11 is a diagram illustrating that the touch electrodes of the display device with the built-in touch screen are divided into groups, and different common voltages are supplied to the respective groups according to an embodiment.

FIG. 10 is a diagram illustrating that different common voltages are supplied to the respective touch electrodes of the display device with the built-in touch screen according to an embodiment, and FIG. 11 is a diagram illustrating that the touch electrodes of the display device with the built-in touch screen are divided into groups and different common voltages are supplied to the respective groups according to an embodiment.

Referring to FIG. 10, the touch electrodes (TE) are disposed in aj×i array (where i and j are natural numbers) in the display device with the built-in touch screen according to one embodiment.

In one embodiment, the multiplexers to supply a common voltage in the switch circuit 160 illustrated in FIG. 7 may be disposed to correspond to the respective touch electrodes (TE), and the respective touch electrodes (TE) may be supplied with different common voltages (Vcom11, Vcom12, . . . , Vcomij) separately selected by the common voltage adjuster 152B shown in FIG. 8.

Further, as illustrated by the embodiment in FIG. 11, the touch electrodes (TE) disposed in the display device with the built-in touch screen may be divided into groups of touch electrodes, and the touch electrode groups may be disposed in al×k array (where l and k are natural numbers).

Thus, in one embodiment, the multiplexers to supply a common voltage in the switch circuit 160 illustrated in FIG. 7 may be disposed to correspond to the respective touch electrode (TE) groups, and the respective touch electrode groups may be supplied with different common voltages (Vcom_g11, Vcom_g12, . . . , Vcom_glk) separately selected by the common voltage adjuster 152B shown in FIG. 8.

As described above, the display device with the built-in touch screen and the method for driving the same according to one embodiment may supply different common voltages to the plurality of touch electrodes (TE) or the plurality of touch electrode (TE) groups, thereby resolving a local stain or screen vibration problem occurring on the display panel.

Further, the display device with the built-in touch screen and the method for driving the same according to one embodiment may provide a compensating voltage to maintain a common voltage supplied to the plurality of touch electrodes (TE) or a group of a plurality of touch electrode (TE), thereby resolving an image quality defect.

Figure 12:
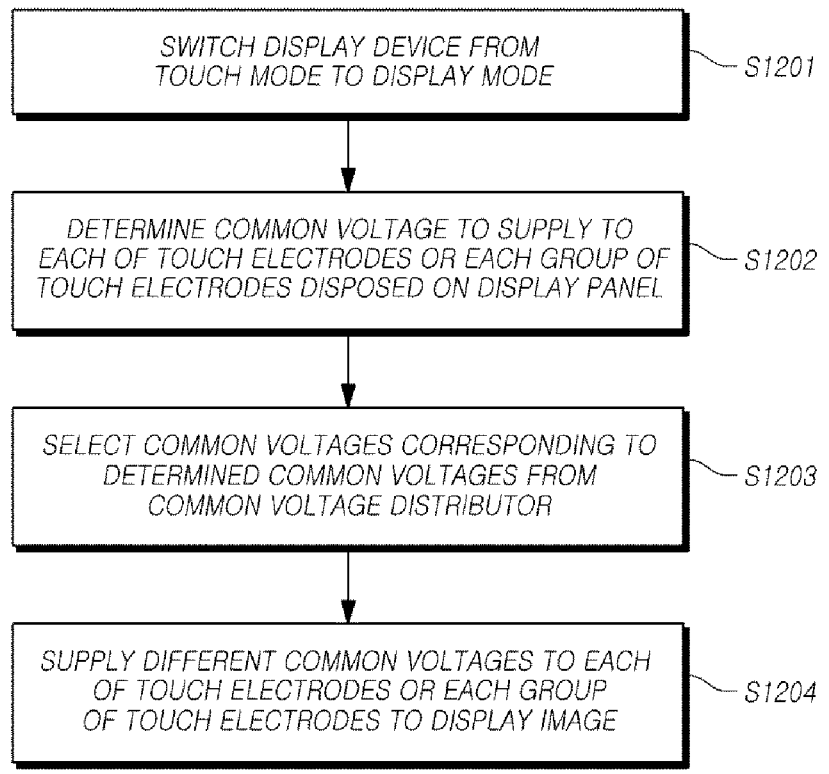
FIG. 12 is a flowchart illustrating display-mode operations of the display device with the built-in touch screen according to one embodiment.

FIG. 12 is a flowchart illustrating display-mode operations of the display device with the built-in touch screen according to one embodiment.

Referring to FIG. 12, the display device with the built-in touch screen according to one embodiment may operate both in the display mode and in the touch mode as illustrated in FIG. 9. The display mode and the touch mode may be periodically repeated, e.g., within one frame.

In one embodiment, a process includes switching a drive mode of the display device with the built-in touch screen from the touch mode to the display mode (S1201), determining common voltages to be supplied to the respective touch electrodes or the respective groups of touch electrodes disposed on the display panel 110 (S1202), selecting common voltages corresponding to the determined common voltages from the common voltage distributor 803 disposed in the common voltage supplier 152 (S1203), and supplying different common voltages to the respective touch electrodes or the respective groups of touch electrodes in the display mode to display an image (S1204).

In one embodiment, separately selected common voltages are supplied to the plurality of touch electrodes disposed on the display panel 110. In other embodiments, the touch electrodes are grouped and different common voltages are supplied to the groups.

To this end, the common voltage distributor 803 generates a plurality of different common voltages based on a predetermined common voltage output from the common voltage generator 152A disposed in the common voltage supplier 152 and supplies two or more of the different common voltages to the touch electrodes or the touch electrode groups.

As described above, the display device with the built-in touch screen and the method for driving the same according to embodiments of the present invention may supply different common voltages to the plurality of touch electrodes (TE) or the plurality of touch electrode (TE) groups, respectively, thereby resolving a local stain or screen vibration problem occurring on the display panel.

Further, the display device with the built-in touch screen and the method for driving the same according to embodiments of the present invention may provide a compensating voltage to maintain a common voltage supplied to the plurality of touch electrodes (TE) or the plurality of touch electrode (TE) groups, thereby resolving an image quality defect.

The above description and the accompanying drawings provide an example of the technical idea of embodiments of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of embodiments of the present invention. Therefore, the embodiments disclosed in the present invention are intended to illustrate the scope of the technical idea of the present invention, and the scope of the present invention is not limited by the embodiment. The scope of embodiments of the present invention shall be construed on the basis of the accompanying claims in such a manner that all of the technical ideas included within the scope equivalent to the claims belong to embodiments of the present invention.

What is claimed is:

1. A display device with a built-in touch screen, the display device comprising:
    a display panel on which a plurality of data lines, a plurality of gate lines and a plurality of touch electrodes are formed, a touch drive signal applied to the touch electrodes when a drive mode is a touch mode;
    a data driver configured to drive the plurality of data lines;
    a gate driver configured to drive the plurality of gate lines;
    a touch sensing unit configured to provide the touch drive signal to the plurality of touch electrodes;
    a common voltage supplier configured to generate a plurality of different common voltages and supply two or more of the plurality of different common voltages to the plurality of touch electrodes when the drive mode is a display mode;
    a switch circuit configured to be disposed between the common voltage supplier and the display panel and to adjust supply of the touch drive signal and the two or more of the plurality of different common voltages supplied to the plurality of touch electrodes, the switch circuit including at least one multiplexer configured to supply the two or more of the plurality of different common voltages to the plurality of touch electrodes;
    a common voltage compensator circuit coupled between the at least one multiplexer that receives the two or more of the plurality of different common voltages from the common voltage supplier and a touch sensing line directly connected to at least one of the plurality of touch electrodes, and configured to provide a compensating voltage directly to the touch sensing line directly connected to the at least one of the plurality of touch electrodes in response to detecting a difference in a common voltage supplied by the common voltage supplier and a common voltage output from the common voltage compensator circuit to the touch sensing line;

a first passivation layer disposed directly on at least one of the plurality of data lines, wherein the touch sensing line and a pixel electrode of a sub-pixel area are disposed directly on the first passivation layer, and wherein the touch sensing line overlaps the at least one of the plurality of data lines;

a second passivation layer disposed directly on the touch sensing line and the pixel electrode, wherein the at least one of the plurality of touch electrodes is disposed on the second passivation layer; and a block matrix disposed on the at least one of the plurality of touch electrodes and overlapping the touch sensing line and the at least one of the plurality of data lines, wherein, when a common voltage of the plurality of different common voltages is supplied to a touch electrode group, all touch sensing lines connected to the at least one multiplexer are short-circuited.

2. The display device of claim 1, wherein the common voltage compensator circuit is a feedback circuit including a comparator.

3. The display device of claim 1, wherein the common voltage supplier includes:
a common voltage determiner configured to determine, for each touch electrode of the plurality of touch electrodes, the common voltage of the plurality of different common voltages to supply to the corresponding touch electrode; and
a common voltage distributor configured to generate the plurality of different common voltages based on a predetermined common voltage.

4. The display device of claim 1, wherein:
the two or more of the plurality of different common voltages includes at least a first common voltage and a second common voltage, the plurality of touch electrodes including at least a first touch electrode and a second touch electrode; and
the common voltage supplier supplies the first common voltage and the second common voltage to the first touch electrode and the second touch electrode, respectively.

5. The display device of claim 1, wherein:
the two or more of the plurality of different common voltages includes at least a first common voltage and a second common voltage, the plurality of touch electrodes including at least a first group of touch electrodes and a second group of touch electrodes; and
the common voltage supplier supplies the first common voltage and the second common voltage to the first group of touch electrodes and the second group of touch electrodes, respectively.

6. A method for driving a display device with a built-in touch screen, the method comprising:
switching a drive mode of a display panel from a touch mode to a display mode, the display panel including a plurality of pixels and a plurality of touch electrodes, the plurality of touch electrodes including at least a first touch electrode and a second touch electrode;
generating a plurality of different common voltages and suppling a first common voltage of the plurality of different common voltages and a second common voltage of the plurality of different common voltages, by a common voltage supplier, in the display mode to display an image on the display panel;

adjusting, by a switch circuit, supply of the first common voltage and the second common voltage to the first touch electrode and the second touch electrode, respectively, the switch circuit including at least one multiplexer configured to supply two or more of the plurality of different common voltages to the plurality of touch electrodes; and providing, by a common voltage compensator circuit, a compensating voltage directly to a touch sensing line directly connected to at least one of the plurality of touch electrodes in response to detecting a difference in a common voltage supplied by the common voltage supplier and a common voltage output from the common voltage compensator circuit to the touch sensing line, wherein the common voltage compensator circuit is coupled between the at least one multiplexer that receives the first common voltage and the second common voltage of the plurality of different common voltages from the common voltage supplier and the touch sensing line, wherein, when a common voltage of the plurality of different common voltages is supplied to a touch electrode group, all touch sensing lines connected to the at least one multiplexer are short-circuited, wherein the display device includes a first passivation layer disposed directly on at least one of a plurality of data lines, wherein the touch sensing line and a pixel electrode of a sub-pixel area are disposed directly on the first passivation layer, and wherein the touch sensing line overlaps the at least one of the plurality of data lines, wherein the display device includes a second passivation layer disposed directly on the touch sensing line and the pixel electrode, wherein the at least one of the plurality of touch electrodes is disposed on the second passivation layer, and wherein the display device includes a block matrix disposed on the at least one of the plurality of touch electrodes and overlapping the touch sensing line and the at least one of the plurality of data lines.

7. The method of claim 6, wherein:
the first touch electrode is located nearer from the common voltage supplier than the second touch electrode is from the common voltage supplier; and
the second common voltage is greater than the first common voltage.

8. The method of claim 6, wherein:
the plurality of touch electrodes include at least a first group of touch electrodes and a second group of touch electrodes, the first group of touch electrodes including the first touch electrode and the second group of touch electrodes including the second touch electrode; and
wherein the method further comprises:
supplying the first common voltage and the second common voltage to the first group of touch electrodes and the second group of touch electrodes, respectively.

9. The method of claim 6, further comprising:
switching the drive mode of the display panel from the display mode to the touch mode; and
providing a touch drive signal to the plurality of touch electrodes.

10. A display device comprising:

a display panel including a plurality of pixels at intersections of a plurality of gate lines and a plurality of data lines, the plurality of pixels including at least a first pixel and a second pixel;

a plurality of touch electrodes including at least a first touch electrode and a second touch electrode;

a common voltage supplier configured to generate a plurality of common voltages including at least a first common voltage and a second common voltage, and configured to provide the first common voltage and the second common voltage to the first touch electrode and the second touch electrode, respectively;

a switch circuit configured to be disposed between the common voltage supplier and a touch sensing line directly connected to at least one of the plurality of touch electrodes and to adjust supply of the plurality of common voltages supplied to the plurality of touch electrodes, the switch circuit including at least one multiplexer configured to supply two or more of the plurality of common voltages to the plurality of touch electrodes;

a common voltage compensator circuit coupled between the at least one multiplexer that receives the plurality of common voltages from the common voltage supplier and the touch sensing line directly connected to at least one of the plurality of touch electrodes, and configured to provide a compensating voltage directly to the touch sensing line directly connected to at least one of the plurality of touch electrodes in response to detecting a difference in a common voltage supplied by the common voltage supplier and a common voltage output from the common voltage compensator circuit to the touch sensing line;

a first passivation layer disposed directly on at least one of the plurality of data lines, wherein the touch sensing line and a pixel electrode of a sub-pixel area are disposed directly on the first passivation layer, and wherein the touch sensing line overlaps the at least one of the plurality of data lines;

a second passivation layer disposed directly on the touch sensing line and the pixel electrode, wherein the at least one of the plurality of touch electrodes is disposed on the second passivation layer; and a block matrix disposed on the at least one of the plurality of touch electrodes and overlapping the touch sensing line and the at least one of the plurality of data lines, wherein, when a common voltage of the plurality of common voltages is supplied to a touch electrode group, all touch sensing lines connected to the at least one multiplexer are short-circuited.

11. The display device of claim 10, wherein the common voltage supplier provides the first common voltage and the second common voltage to the first touch electrode and the second touch electrode, respectively, during a display period of a frame.

12. The display device of claim 11, further comprising:
a touch sensing circuit configured to provide a touch drive signal to the plurality of touch electrodes during a touch period of the frame.

13. The display device of claim 10, wherein the first touch electrode is located at a first distance from the common voltage supplier and the second touch electrode is located at a second distance greater than the first distance from the common voltage supplier.

14. The display device of claim 13, wherein the second common voltage is greater than the first common voltage.

15. The display device of claim 10, wherein the plurality of common voltages includes three or more different common voltages, and wherein the common voltage supplier includes a voltage divider circuit to generate the plurality of common voltages from a predetermined common voltage.

16. The display device of claim 10, wherein:
the plurality of touch electrodes include at least a first group of touch electrodes and a second group of touch electrodes, the first group of touch electrodes including the first touch electrode and the second group of touch electrodes including the second touch electrode; and
the common voltage supplier provides the first common voltage and the second common voltage to the first group of touch electrodes and the second group of touch electrodes, respectively.

17. The display device of claim 16, wherein the first group of touch electrodes are located nearer from the common voltage supplier than the second group of touch electrodes are from the common voltage supplier.

18. The display device of claim 17, wherein the second common voltage is greater than the first common voltage.

* * * * *